United States Patent Office 3,773,809
Patented Nov. 20, 1973

3,773,809
SEPARATION OF ORGANIC PHOSPHORUS COMPOUNDS AND THEIR METAL COMPLEXES FROM ORGANIC NITRILES IN THE HYDROCYANATION OF OLEFINS
Jack William Walter, Wilmington, Del., assignor to E. I. du Pont de Nemours and Company, Wilmington, Del.
No Drawing. Continuation-in-part of abandoned application Ser. No. 86,587, Nov. 3, 1970. This application June 28, 1972, Ser. No. 267,106
Int. Cl. C07c *121/04*
U.S. Cl. 260—465.8 R      13 Claims

ABSTRACT OF THE DISCLOSURE

A process for separating an organic phosphorus compound such as a phosphite or phosphonite or a zerovalent nickel complex of the organic phosphorus compound from a product fluid containing organic nitriles produced by hydrocyanating an ethylenically unsaturated organic mono-nitrile such as 3-pentenenitrile through extraction of the product fluid with a paraffin or cycloparaffin hydrocarbon solvent at a temperature of about 0° C. to about 100° C. to produce a multiphase mixture wherein the organic phosphorus compounds and their metal complexes are contained predominantly in the hydrocarbon phase and the organic mono- and dinitriles and degradation products are contained in a separate phase.

CROSS-REFERENCE TO RELATED APPLICATIONS

This is a continuation-in-part of my U.S. application, Ser. No. 86,587, filed Nov. 3, 1970, now abandoned.

BACKGROUND OF THE INVENTION

In the hydrocyanation of nonconjugated ethylenically unsaturated organic compounds such as 3-pentenenitrile to produce dinitriles such as adiponitrile or methylglutaronitrile in the presence of certain low valent nickel complexes as described in U.S. Pats. 3,496,215, 3,496,217 and 3,496,218, as well as in the removal of certain undesired by-products as described in U.S. Pat. 3,564,040, it is frequently necessary to remove the catalyst complex from the reaction products for recycling of the catalyst or for purification of the reaction products. Fractional distillation is in general a convenient method for effecting such separations. However, in the case of the organic phosphorus compounds as well as some of the organic metal complexes, the elevated temperature required for fractional distillation has an adverse effect, causing disproportionation and in some cases degradation of the organic phosphorus compounds and the organic metal complexes as well as isomerization of reaction products.

STATEMENT OF THE INVENTION

Accordingly, it is an object of this invention to provide an improved method for separating organic phosphorus compounds and their zerovalent nickel complexes from hydrocyanation product fluids containing organic dinitriles as well as unreacted organic mononitriles and degradation products of the organic phosphorus compounds and their metal complexes.

This invention resides in the discovery of a process for separating an organic phosphorus compound or its metal complex from a hydrocyanation product fluid containing predominantly organic dinitrile and unreacted organic mononitrile and degradation products of the organic phosphorus compounds and their metal complexes by extracting the product fluid with a paraffin or cycloparaffin hydrocarbon at a temperature in the range of about 0° C. to about 100° C. The composition of the product fluid must be controlled so that the molar ratio of organic mononitrile to organic dinitrile contained therein is less than about 0.65 and preferably about 0.3 in order that there is formed with the hydrocarbon solvent a multiphase mixture on which this method of separation depends. One method for effecting this is to control the level of hydrocyanation of the mononitrile. For instance, to achieve a mole ratio of mononitrile to dinitrile less than about 0.65, a degree of conversion of at least about 60 percent would be maintained. In some instances it may be desirable to conduct the hydrocyanation at a lower level of conversion of the organic mononitrile in which case the required mole ratio of mononitrile to dinitrile in the product fluid can be effected by removing mononitrile, for example, by flash distillation. Another approach for achieving the required mononitrile/dinitrile ratio is to introduce added quantities of the dinitrile until the required ratio is reached. The separation method of this invention is particularly adaptable to product fluids resulting from hydrocyanation of organic mononitriles such as 3-pentenenitrile or 4-pentenenitrile. The organic dinitriles contained in the product fluid are typified by adiponitrile, methylglutaronitrile and ethylsuccinonitrile.

The organic phosphorus compounds comprise those of the formula $PZ_3$ where Z is an R or OR group, R is an alkyl, aryl or alkoxyaryl group having up to 18 carbon atoms and at least one Z is OR, wherein Z may be the same or different and may be cojoined, and zerovalent nickel complexes of the formula $NiL_4$ wherein L is a sigma-pi bonding neutral ligand represented by $PZ_3$. Hydrocyanations with these zerovalent complexes are carried out at temperatures in the range of —25° C. to 200° C., preferably in the range of 0° C. to 150° C. Pressures in the range of 0.05 to 100 atmospheres can be employed; a range of 0.05 to 10 atmospheres is preferred. The hydrocyanations can be carried out conveniently at atmospheric pressure.

Typical organic phosphorus compounds corresponding to $PZ_3$ include $P(OC_6H_5)_3$, $P(OC_6H_4CH_3)_3$, $P(C_6H_4OCH_3)_3$, $P(OC_4H_9)_3$, $P(OC_2H_5)_3$, $P(OC_6H_5)_2(C_2H_5)$, $P(OC_4H_9)_2(C_6H_5)$, $P(OC_6H_5)(C_2H_5)_2$, and $P(OC_4H_9)(C_6H_5)_2$ Nickel complexes of the type $NiL_4$ include
$Ni[P(OC_2H_5)_3]_4$, $Ni[P(OC_4H_9)_3]_4$, $Ni[P(OC_6H_5)_3]_4$, $$Ni\left[P\left(O-\!\!\!\left\langle\!\!\!\bigcirc\!\!\!\right\rangle\!\!\!-CH_3\right)_3\right]_4$$

$Ni[P(OC_6H_5)_2(C_4H_9)]_4$, $Ni[P(OC_6H_5)(C_4H_9)_2]_4$
and
$Ni[P(OC_4H_9)_2(C_6H_5)]_4$ Other zerovalent nickel complexes which are useful in hydrocyanation reactions and which can be recovered by the process of this invention are those of the formulae $Ni(PZ_3)_3R^2$—CN and $Ni(PZ_3)_2A$ wherein Z is R or OR, R is an alkyl or aryl radical having up to 18 carbon atoms and at least one Z is OR, and the groups are so chosen that the ligand has a cone angle with an average value between 130° and 170°; wherein A is an unsaturated organic compound containing from 2 to 20 carbon atoms and having at least one olefinic carbon-carbon double bond and wherein $R^2$ is of the class consisting of 2-butenyl and 3-butenyl radicals. The cone angle is determined as described by C. A. Tolman, J. Am. Chem. Soc. 92, 2956 (1970). Typical trivalent phosphorus ester ligands of this type include tri-o-tolylphosphite (cone angle 141°), phenyl di-o-tolylphosphonite (cone angle 142°), and tri (2,5-xylyl)-phosphite (cone angle 144°). Typical corresponding zerovalent nickel complexes include Ni[P(O—o—C₆H₄CH₃)₃]₃[CH₃CH=CHCH₂CN], Ni[P(O—o—C₆H₄CH₃)₃]₃[NC(CH₂)₄CN], and Ni[P(O—o—C₆H₄CH₃)₃]₂[C₂H₄]. These zerovalent nickel complexes and their use in hydrocyanation reactions are described in detail in U.S. patent application Ser. No. 168,352, filed Aug. 2, 1971 by L. M. King, W. C. Seidel and C. A. Tolman. Such hydrocyanations are carried out at a temperature in the range of −50° C. to 200° C. and at a pressure in the range of about 0.05 to about 100 atmospheres. Preferred conditions are temperature in the range of about −15° C. to about 75° C. and pressure in the range of about 0.05 to about 10 atmospheres.

In the multiphase mixture described above, the organic phosphorus compounds and their zerovalent nickel complexes are found predominantly in the hydrocarbon solvent phase. The organic mono- and dinitriles, catalyst promoter or residue of the catalyst promoter and degraded nickel catalyst are found predominantly in at least one other phase distinct from the hydrocarbon phase. The other phase (or phases) also contains degradation products of the organic phosphorus compounds in sufficient quantity to permit an efficient purge of these compounds from the organic phosphorus compounds and their zerovalent nickel complexes recovered in the hydrocarbon solvent phase. The degradation products of the organic phosphorus compounds comprise those wherein the phosphorus atom is joined directly by covalent bands to four other atoms or groups. These quadruply connected phosphorus compounds are produced by hydrolysis, oxidation, rearrangement or by reaction with the nitriles or metal complexes in the hydrocyanation process. Typical compounds of this type include

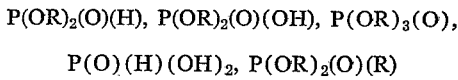

P(OR)₂(O)(H), P(OR)₂(O)(OH), P(OR)₃(O),

P(O)(H)(OH)₂, P(OR)₂(O)(R)

and P(OR)₂(O)(R³) wherein R is defined as in the foregoing description, O designates oxygen, H designates hydrogen and R³ is 2-butenyl or isobutenyl. Some of these degradation products, as well as the degraded nickel catalyst which may be at least partially in the form of nickel cyanide or nickel halide, are soluble in the organic mono- and dinitriles and others are precipitated therefrom. In any event, the organic mononitriles and dinitriles can be recovered from the degraded material as well as from the catalyst promoter by distillation or by filtration.

The hydrocarbon solvents include paraffins and cycloparaffins having a boiling point in the range of about 30° C. to about 135° C. Typical solvents include n-pentane, n-hexane, n-heptane and n-octane as well as the corresponding branch chain paraffin hydrocarbons having a boiling point within the range specified. Useful cyclic hydrocarbons include cyclopentane, cyclohexane and cycloheptane as well as alkyl substituted cycloparaffins having a boiling point within the specified range. Mixtures of solvents may also be used such as, for example, mixtures of the solvents noted above or commercial heptane which contains a number of hydrocarbons in addition to n-heptane.

In the hydrocyanation reactions described above, a promoter is normally used to improve the activity of the catalyst for the hydrocyanation reaction and to control distribution of the products. The promoter generally is a cationic form of a metal selected from the class of zinc, cadmium, beryllium, aluminum, gallium, indium, thallium, titanium, zirconium, hafnium, erbium, germanium, tin, vanadium, niobium, scandium, chromium, molybdenum, tungsten, manganese, rhenium, palladium, thorium, iron and cobalt. Among these the cations of zinc, cadmium, titanium, tin, chromium, iron and cobalt are preferred. The anion portion of the compound may be a halide such as fluoride, chloride, bromide and iodide, anions of lower fatty acids of from 2 to 7 carbon atoms, HPO₃=, H₂PO₂⁻, CF₃COO⁻, C₇H₁₅OSO₂⁻, SO₄=, etc.

Also useful as a promoter in the hydrocyanation reaction described above are the borohydrides and organoboron compounds of the formulae B(R³)₃ and B(OR³)₃ wherein R³ is of the class consisting of hydrogen, aryl radicals of from 6 to 18 carbon atoms, aryl radicals substituted with groups that do not interfere such as lower alkyl radicals of from 1 to 7 carbon atoms and lower alkyl radicals of from 1 to 7 carbon atoms substituted with a cyano radical. Among the promoters of this type triphenyl borane is especially preferred. As indicated above, the catalyst promoter can be recovered from the organic nitrile either for re-use in further hydrocyanation or for discard.

The extraction process described above can be carried out as a batch process or it can be done continuously. A particularly useful technique comprises a continuous countercurrent operation.

In these operations, the ratio of organic phosphorus compound to the nitrile being extracted may range from 1/1000 parts to 90/100 parts; the ratio of hydrocarbon to organic phosphorus compound may range from 2/1 parts to 100/1 parts, all parts being by weight. The extractions may be carried out at atmospheric pressure or at elevated pressures to avoid undue evaporation of the solvents.

A particular advantage of the process as set forth is that it provides not only means for recovering organic phosphorus compounds and organic mononitrile for recycling in the hydrocyanation process, but also means for purging the system of degraded catalyst materials and degraded organic phosphorus compounds, which is of value especially for high efficiency, continuous production operations.

Description of preferred embodiments

It is preferred to carry out the extractions at atmospheric pressure and in a continuous countercurrent extractor and in the temperature range of about 20° C. to about 60° C. Preferred solvents are cyclohexane, n-hexane and n-heptane. The preferred ratio of solvent to organic phosphorus compound is in the range of 2/1 to 15/1.

The invention is morefully illustrated in the examples to follow. The use of the extraction process to separate a nickel catalyst mixture from a product fluid obtained from hydrocyanation of 3-pentenenitrile is illustrated in Examples 6 and 8. Examples 1–5 and 7 illustrate the extraction process with product fluids simulative of typical hydrocyanation runs.

EXAMPLE 1

Extraction of nickel catalyst mixture from adiponitrile with n-heptane

A catalyst mixture is prepared by reacting with agitation at 110° C. for two hours 5.4 grams of NiCl₂, 2.7 grams of 325 mesh zinc dust, 100 ml. of 3-pentene-nitrile (3PN)) and 105 ml. of a freshly distilled reaction product of mixed tritolyl phosphites (TTP), made by reacting PCl₃ with a mixture comprising predominantly cresols (85% m- and p-cresols). In a separatory funnel were placed 25 ml. of the catalyst solution (density, 1.0) containing 47.3% of mixed pentenenitriles (PN's), 0.88% Ni (the remainder being primarily TTP), 25 ml. of adiponitrile (ADN) and 25 ml. of n-heptane. Upon standing after shaking at room temperature (about 25° C.) the mixture separates into a light phase (30 ml., density 0.830) and a heavy phase (43.5 ml., density 0.936), the analyses of which is tabulated below. The nitriles are determined by gas chromatography; the metals are determined by atomic absorption.

| Substance | Weight percent of— | |
|---|---|---|
|  | Heavy phase | Light phase |
| Heptane | 5.47 | 62.9 |
| PN's | 25.0 | 5.09 |
| Ni [a] | 0.15 | 0.83 |
| Zn [b] | 0.67 | <0.01 |
| ADN | 55.1 | 1.47 |

[a] Elemental nickel.
[b] Elemental zinc.

This represents a 94 percent recovery of the nickel catalyst from the nitrile rich starting solution, based upon the amount of nickel found in the light phase in reference to the amount of nickel in the starting material.

EXAMPLE 2

Extraction of nickel catalyst mixture from mixed dinitriles (DN's) with n-heptane Following the procedure of Example 1 except that adiponitrile (ADN) is replaced by a mixture of dinitriles (DN's) comprising 86% of mthylglutaronitrile (MGN), 11% of ethylsuccinonitrile (ESN) and 2% of ADN, there is otbained a light phase (28 ml., density 0.852) and a heavy phase (47 ml., density 0.936), having the following compositions.

| Substance | Weight percent of— | |
|---|---|---|
|  | Heavy phase | Light phase |
| Heptane | 7.22 | 69.9 |
| PN's | 24.4 | 3.30 |
| Ni [a] | 0.27 | 0.60 |
| Zn [b] | 0.75 | <0.01 |
| DN's | 50.6 | 2.38 |

[a] Elemental nickel.
[b] Elemental zinc.

This represents 65% recovery of the nickel from the nitrile rich phase, based on the amount of nickel found in the light phase in reference to the amount of nickel in the starting material.

EXAMPLE 3

Continuous extraction of nickel catalyst mixture from adiponitrile with cyclohexane This example further illustrates the feasibility of separating organic dinitriles and zinc chloride as well as nickel complexed with mixed tritolyl phosphite (TTP) made as in Example 1, in catalyst mixtures containing an excess of TTP.

In a continuously agitated 5 liter glass vessel kept at 50° C. are mixed 3650 grams of complexed nickel catalyst solution, 2316 grams of adiponitrile (ADN), and 4638 grams of cyclohexane. Composition of the nickel catalyst solution is 1763 grams (16 wt. percent) of pentenenitriles (PN's), 30.6 grams (.52 mole) of nickel, 39.9 grams of zinc (as zinc chloride), 1272 grams (3.6 moles) of TTP, and the remainder inert materials. These materials are added to the mixing vessel at intervals over a 3 hour period so as to maintain the mixing vessel about half full while material is continuously withdrawn into a separate glass decanting vessel. The mixture separates into a light, cyclohexane rich phase and a heavy, dinitrile rich phase in the decanter and portions of both phases are continuously withdrawn from the decanter so as to maintain a constant inventory of each phase in the decanting vessel, which is also held at 50° C.

Weights and compositions of the recovered heavy and light phases are given below. On evaporation of cyclohexane from the light phase a concentrate is obtained with the composition shown.

| Substance | Heavy phase, grams | Light phase, grams | Concentrate, grams |
|---|---|---|---|
| Total weight | 4,654 | 4,610 | 1,233 |
| Cyclohexane | 478 | 3,092 | 31 |
| PN's | 1,231 | 232 | 33 |
| ADN | 2,396 | 101 | 83 |
| Ni [a] | 2.6 | 41.2 | 26.8 |
| Zn [b] | 29 | 0.14 | 0.09 |
| TTP | 191 | 1,247 | 967 |

[a] Elemental nickel.
[b] Elemental zinc.

From the light phase concentrate, recovery of nickel is 76%, based on the amount in the starting solution; recovery of TTP is 76.5%. Distribution of ADN in the heavy phase is 96% and recovery of the pentenenitrile is 70%.

EXAMPLE 4

Extraction of nickel catalyst mixture from dinitriles (DN'S)—effect of solvent dinitrile ratio The procedure of extraction and the catalyst mixture are substantially as described in Example 1. The results are shown in Tables I to III. As will be seen, separation of nickel is most effective from a dinitrile rich system. It will be noted also that a phase inversion occurs at the high ADN content in the mixture (Table I, column 2).

TABLE I

Extraction of Catalyst Mixture Between Dinitriles (DN's) and Cyclohexane (Cyane)

| Catalyst Number | 1 | | 2 | | 3 | |
|---|---|---|---|---|---|---|
| Catalyst mixture, ml | 25 | | 25 | | 25 | |
| ADN, ml | 25 | | 37.5 | | 12.5 | |
| Cyane, ml | 25 | | 12.5 | | 37.5 | |
|  | Light | Heavy | Light | Heavy | Light | Heavy |
| Volume, ml | 29.5 | 43.0 | 59.5 | 13.7 | 46.5 | 22.5 |
| Density, g./cc | .891 | .928 | .940 | .947 | .855 | .909 |
|  | | | Phase inversion | | | |
| Analysis, wt. percent: | | | | | | |
| Cyane | 62.2 | 8.61 | 6.58 | 41.6 | 68.5 | 10.5 |
| PN's | 5.16 | 24.0 | 17.4 | 4.08 | 5.85 | 31.2 |
| Ni | 0.94 | 0.09 | 0.09 | 1.90 | 0.58 | 0.21 |
| Zn | 0.003 | 0.53 | 0.54 | 0.005 | 0.004 | 1.03 |
| DN's | 2.25 | 56.1 | 61.6 | 2.72 | 2.68 | 44.9 |
|  | K=Wt. percent in cyane phase/Wt. percent in DN phase | | | | | |
| Distribution coefficient: | | | | | | |
| PN's | 0.22 | | 0.21 | | 0.19 | |
| Ni | 3.9 | | 21 | | 2.8 | |
| Zn | 0.0047 | | 0.0093 | | 0.0034 | |
| DN's | 0.040 | | 0.044 | | 0.060 | |
| Cyane | 7.2 | | 6.3 | | 6.6 | |

Note.—Legend: ADN=Adiponitrile; Cyane=Cyclohexane; PN's=Pentenenitriles; DN's=Dinitriles; Ni=Elemental nickel; Zn=Elemental zinc.

TABLE II
Extraction of Catalyst Mixture Between Dinitriles (DN's) and n-Hexane

| Experiment Number | 1 | | 2 | | 3 | | 4 | |
|---|---|---|---|---|---|---|---|---|
| Catalyst mixture, ml | 25 | | 25 | | 25 | | 25 | |
| ADN, ml | 25 | | 37.5 | | 12.5 | | | |
| n-Hexane, ml | 25 | | 12.5 | | 37.5 | | 25 | |
| MGN, ml | | | | | | | 25 | |
| | Light | Heavy | Light | Heavy | Light | Heavy | Light | Heavy |
| Phase: | | | | | | | | |
| Volume, ml | 29.5 | 44 | 15 | 57.5 | 46.5 | 28 | 27 | 46.5 |
| Density, g./cc | 0.801 | 0.932 | 0.885 | 0.939 | 0.974 | 0.909 | 0.790 | 0.919 |
| Analyses, wt. percent: | | | | | | | | |
| Hexane | 69.4 | 5.44 | 40.8 | 4.07 | 83.4 | 8.13 | 95.5 | 9.82 |
| PN's | 6.33 | 25.8 | 5.73 | 20.0 | 5.14 | 33.3 | 3.89 | 24.3 |
| Ni | 0.89 | 0.17 | 1.66 | 0.13 | 0.39 | 0.25 | 0.99 | 0.23 |
| Zn | <0.01 | Lost | <0.01 | 0.57 | <0.01 | 0.99 | <0.01 | 0.89 |
| DN's | 2.03 | 55.9 | 2.99 | 64.0 | 1.60 | 44.6 | 3.33 | 53.8 |

K = Wt. percent in hexane phase/wt. percent in DN phase

| Distribution coefficient: | | | | |
|---|---|---|---|---|
| PN's | 0.25 | 0.29 | 0.15 | 0.16 |
| Ni | 5.1 | 13 | 1.6 | 3.4 |
| Zn | | <0.018 | <0.013 | <0.011 |
| DN's | 0.036 | 0.043 | 0.036 | 0.062 |
| Hexane | 13 | 10 | 10 | 9.7 |

NOTE.—Legend: ADN=Adiponitrile; MGM=Methylglutaronitrile; PN's=Pentenenitriles; DN's=Dinitriles; Ni=Elemental nickel; Zn=Elemental zinc.

TABLE III
Extraction of Catalyst Mixture Between Dinitriles (DN's) and n-Heptane

| Experiment Number | 1 | | 2 | | 3 | | 4 | |
|---|---|---|---|---|---|---|---|---|
| Catalyst mixture, ml | 25 | | 25 | | 25 | | 25 | |
| ADN, ml | 25 | | 37.5 | | 12.5 | | | |
| n-Heptane, ml | 25 | | 12.5 | | 37.5 | | 25 | |
| MGN, ml | | | | | | | 25 | |
| | Light | Heavy | Light | Heavy | Light | Heavy | Light | Heavy |
| Phase: | | | | | | | | |
| Volume, ml | 30 | 43.5 | 16 | 56.5 | 45.5 | 28 | 28 | 47 |
| Density, g./cc | 0.830 | 0.936 | 0.891 | 0.966 | 0.807 | 0.904 | 0.852 | 0.936 |
| Analyses, wt. percent: | | | | | | | | |
| Heptane | 62.9 | 5.47 | 42.4 | 3.98 | 93.8 | 7.79 | 69.9 | 9.22 |
| PN's | 5.09 | 25.0 | 6.28 | 20.1 | 6.84 | 32.6 | 3.30 | 24.4 |
| Ni | 0.83 | 0.15 | 1.77 | 0.12 | 0.36 | 0.24 | 0.60 | 0.27 |
| Zn | <0.01 | 0.67 | <0.01 | 1.23 | <0.01 | 0.22 | <0.01 | 0.75 |
| DN's | 1.47 | 55.1 | 2.18 | 64.9 | 1.63 | 42.8 | 2.38 | 50.6 |

K = Wt. percent in heptane phase/Wt. percent in DN phase

| Distribution coefficient: | | | | |
|---|---|---|---|---|
| PN's | 0.20 | 0.31 | 0.21 | 0.14 |
| Ni | 5.5 | 15 | 1.5 | 2.2 |
| Zn | <0.015 | <0.008 | <0.011 | <0.013 |
| DN's | 0.027 | 0.034 | 0.038 | 0.047 |
| Heptane | 11 | 11 | 9.5 | 9.7 |

NOTE.—Legend: ADN=Adiponitrile; MGN=Methylglutaronitrile; PN's=Pentenenitriles; DN's=Dinitriles; Ni=Elemental nickel; Zn=Elemental zinc.

EXAMPLE 5
Extraction of phosphonite ligand from dinitrile with cyclohexane (A) Phosphonite ligand: In a 50 ml. beaker with a magnetic stirrer 1 ml. of $CH_3P(OC_6H_5)_2$ and 10 ml. of adiponitrile are mixed and 10 ml. of cyclohexane is added. The solution at room temperature (about 25° C.) is stirred for 10 minutes, then the two layers are separated using a 125 ml. separatory funnel. Analysis by NMR shows the cyclohexane layer to contain 4.6 wt. percent $CH_3P(OC_6H_5)_2$ and adiponitrile layer to contain 4.6 wt. percent $CH_3P(OC_6H_5)_2$.

(B) Phosphonite ligand: In a 50 ml. beaker with a magnetic stirrer 1 ml. of $CH_3P(OC_6H_4 \cdot CH_3)_2$, and 10 ml. of adiponitrile are mixed and 10 ml. of cyclohexane is added. The mixture at room temperature (about 25° C.) is stirred for 10 minutes then the two layers are separated using a 125 ml. separatory funnel. Analysis by NMR shows the cyclohexane layer to contain 4.1 wt. percent $CH_3P(OC_6H_4 \cdot CH_3)_2$ and adiponitrile layer to contain 7.2 wt. percent $CH_3P(OC_6H_4 \cdot CH_3)_2$.

Because separate phases are formed with these ligands, separation of these ligands is feasible by recycling of the solvent, even though distribution of the ligand between the cyclohexane and the dinitrile is less favorable than is the case with the phosphite ligands.

EXAMPLE 6
Extraction of nickel catalyst mixture from hydrocyanation run

A product fluid produced by hydrocyanation of 3-pentenenitrile to a conversion of approximately 85% by contacting with a catalyst mixture prepared as described in Example 1 was subjected to continuous countercurrent extraction with cyclohexane (cyane) in a multi-stage XB-3 York-Scheibel column.

The overall results of the extraction run are shown in tabular form below.

| Substance | Total fed, lbs. | Total (lbs.) in— | |
|---|---|---|---|
| | | Light phase | Heavy phase |
| TTP | 109.809 | 100.481 | 2.721 |
| Cresols | 8.553 | 0.449 | 7.821 |
| Nickel | 1.242 | 0.994 | 0.116 |
| Zinc | 1.135 | 0.017 | 1.326 |
| Cyane | 74.600 | 56.597 | 12.619 |
| C2PN | 0.655 | | 0.660 |
| CeM2BN | 0.988 | 0.023 | 1.125 |
| T2PN | 0.840 | | 0.862 |
| T3PN | 21.375 | 2.461 | 19.504 |
| 4PN | 0.240 | | 0.416 |
| C3PN | 3.023 | 0.169 | 2.868 |
| ESN | 3.321 | 0.097 | 3.158 |
| MGN | 26.797 | 1.126 | 25.256 |
| ADN | 142.671 | 6.732 | 134.719 |

It will be seen that the catalyst components, the TTP ligand and nickel are predominantly found in the light, cyane phase whereas the dinitriles, ESN, MGN and ADN, as well as the mononitriles, are found predominantly in the heavy, dinitrile phase. Degraded nickel catalyst collected in the dinitrile phase as an insoluble residue is separated by filtration and the nitriles are recovered from any other soluble residues or degradation products by distillation.

Legend:
- TTP—mixed tritolyl phosphite
- Cresols—mainly m and p cresols
- Nickel—elemental
- Zinc—elemental
- Cyane—cyclohexane
- C2PN—cis-2-pentenenitrile
- C2M2BN—cis-2-methyl-2-butenenitrile
- T2PN—trans-2-pentenenitrile
- T3PN—trans-3-pentenenitrile
- 4PN—4-pentenenitrile
- C3PN—cis-3-pentenenitrile
- ESN—ethylsuccinonitrile
- MGM—methylglutaronitrile
- ADN—adiponitrile

EXAMPLE 7

Extraction of nickel catalyst mixture with commercial heptane

Ten grams of catalyst solution containing nickel complexed with mixed tritolyl phosphites, Ni(TTP)$_4$, and excess of mixed tritolyl phosphites (TTP) in pentenenitriles is dissolved in 7.55 grams of adiponitrile. Composition of the solution is shown in Table IV below. To 13.57 grams of the above solution is added 20.0 grams of commercial grade heptane* in a separatory funnel. The phases are separated and the heavy phase is extracted again with 10.0 grams of commercial heptane and the light phases are composited. Total weight of the light phase is 34.2 grams; total weight of the heavy phase is 9.0 grams. Both phases are analyzed and the compositions are given in the Table IV.

The remaining light phase, 30.0 grams, is evaporated under N$_2$ at atmospheric pressure and at a temperature up to about 150° C. There remains 2.84 grams of viscous catalyst solution. Analysis shows it to be primarily Ni(TTP)$_4$ and TTP (Table IV), for recovery of 54% of the starting Ni(TTP)$_4$, exclusive of samples taken. Recovery of Ni(TTP)$_4$, based on analysis of the starting solution and the light phase, is 71%; recovery of total TTP is 70%.

TABLE IV

| Substance | Weight percent of— | | |
|---|---|---|---|
| | Starting solution | Light phase | Heavy phase |
| Ni(TTP)$_4$ [a] | 14.9 | 4.2 | None detected. |
| TTP [b] (total) | 25.5 | 7.1 | 2.27 |
| Ni [c] | 0.442 | 0.15 | 0.036. |
| ADN [b] | 40.8 | 1.32 | 62.5. |
| PN's [b] | 27.4 | 4.10 | 38.5. |

[a] By liquid phase chromatography.
[b] By gas chromatography.
[c] By atomic absorption.

Concentrate of light phase

| Substance: | Weight percent |
|---|---|
| Ni(TTP)$_4$ | 38.5 |
| TTP (includes TTP in Ni(TTP)$_4$ | 91.5 |
| Ni | 1.84 |

*Commercial grade n-heptane from American Mineral Spirits Co., containing approximately 73% of paraffinic heptanes, 23% cycloheptanes and 4% aromatics.

EXAMPLE 8

Extraction of nickel catalyst mixture from hydrocyanation run

A product fluid produced from hydrogen cyanide, 3-pentenenitrile and the zerovalent nickel complex

and comprising by weight 7.177% of organic mononitriles, 57.89% of organic dinitriles, 30.33% of tri-o-tolyl phosphite, 0.174% of zerovalent nickel (determined by gel permeation chromatography) and 0.056% of ionic nickel was fed to a Mixco extractor column along with cyane at a 1.43 weight ratio of cyane to feed. The cyane extract phase from the extractor comprised 24.5% of organic mononitriles, 1.28% of organic dinitriles, 99.7% of tri-o-tolyl phosphite, 96.5% of zerovalent nickel and 56.5% of ionic nickel, all percentages being by weight and based on the combined amounts of the given ingredients in the cyane and raffinate phases.

I claim:
1. In a process of hydrocyanating an ethylenically unsaturated organic mononitrile of the group consisting of 3-pentenenitrile and 4-pentenenitrile in the presence of a metal catalyst consisting essentially of a zerovalent nickel complex of the group consisting of Ni(PZ$_3$)$_4$,

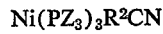

and Ni(PZ$_3$)$_2$A wherein Z is of the group consisting of R and OR, R is of the group consisting of alkyl, aryl and alkoxyaryl radicals having up to 18 carbon atoms and at least one Z is OR, the complexes Ni(PZ$_3$)$_3$R$^2$CN and Ni(PZ$_3$)$_2$A being further characterized in that the R radicals of a given PZ$_3$ ligand are so chosen that the ligand has a cone angle with an average value between 130° and 170°, wherein R$^2$ is of then group consisting of 2-butenyl and 3-butenyl radicals and A is of the group consisting of a 3-pentenenitrile and 4-pentenenitrile; and a catalyst promoter, the promoter being of the group consisting of a cation of a metal, a borohydride or an organoboron compound, the cation being of the group of metals consisting of zinc, cadmium, beryllium, aluminum, gallium, indium, thallium, titanium, zirconium, hafnium, erbium, germanium, tin, vanadium, niobium, scandium, chromium, molybdenum, tungsten, manganese, rhenium, palladium, thorium, iron and cobalt; the borohydrides and organoboron compounds being of the formulae B(R$^3$)$_3$ and B(OR$^3$)$_3$ wherein R$_3$ is of the group consisting of hydrogen, aryl radicals of from 6 to 18 carbon atoms and aryl radicals substituted with lower alkyl radicals of from 1 to 7 carbon atoms and with lower alkyl radicals of from 1 to 7 carbon atoms substituted with a cyano radical; to form a product fluid consisting essentially of organic dinitriles, unreacted organic mononitriles, organic phosphorus compounds of the group consisting of PZ$_3$ zerovalent nickel complexes Ni(PZ$_3$)$_4$, Ni(PZ$_3$)$_3$R$^2$CN and Ni(PZ$_3$)$_2$A, catalyst promoter, degraded nickel catalyst and degraded organic phosphorus compounds, and recovering the organic dinitrile;

the improvement which comprises (a) controlling the composition of the product fluid so that the molar ratio of organic mononitrile to organic dinitrile contained therein is less than about 0.65, (b) contacting the product fluid in an extractor at a temperature in the range of about 0° C. to about 100° C. with a hydrocarbon solvent of the group consisting of paraffin and cycloparaffin hydrocarbons and mixtures thereof having a boiling point in the range of about 30° C. to about 135° C., the ratio of organic phosphorus compound to the organic nitriles in the product fluid being from 1/1000 to 90/100 parts by weight, the ratio of hydrocarbon to organic phosphorus compounds in the product fluid ranging from 2/1 to 100/1 parts by weight, to form a multiphase mixture, one phase of which contains the hydrocarbon solvent and predominantly the organic phosphorus compounds and their zerovalent nickel complexes and in which organic mononitriles and organic dinitriles, degraded nickel catalyst, degraded organic phosphorus compounds, and catalyst promoter are contained predominantly in at least one other phase, (c) isolating the hydrocarbon solvent phase and recovering the organic phosphorus compounds and their zerovalent nickel complexes therefrom, and (d) recovering organic mononitriles, organic dinitriles and catalyst promoters from the degraded nickel catalyst and degraded organic phosphorus compounds.

2. The process of claim 1 wherein the molar ratio of mononitrile to dinitrile specified in step (a) is effected by conducting the hydrocyanation of mononitrile to dinitrile to a conversion of at least about 60 percent.

3. The process of claim 1 wherein the molar ratio of mononitrile to dinitrile specified in step (a) is effected by removing organic mononitrile from the product fluid.

4. The process of claim 2 wherein the zerovalent complex of nickel has the formula $Ni(PZ_3)_4$ and the catalyst promoter is zinc chloride.

5. The process of claim 4 wherein the organic dinitrile is of the group consisting of adiponitrile, methylglutaronitrile and ethylsuccinonitrile.

6. The process of claim 5 wherein the hydrocarbon solvent is of the group consisting of n-hexane, cyclohexane and n-heptane.

7. The process of claim 6 wherein the extraction is carried out at a temperature in the range of about 20° C. to about 60° C. and the ratio of solvent to organic phosphorus compound is in the range of about 2/1 to about 15/1 by weight.

8. The process of claim 7 wherein the organic phosphorus compounds comprise a triaryl phosphite and its zerovalent nickel complex.

9. The process of claim 8 wherein the triaryl phosphite is mixed meta- and para-tritolyl phosphite.

10. The process of claim 1 wherein the extractor is a continuous countercurrent extractor.

11. The process of claim 1 wherein the zerovalent nickel complex is of the group consisting of $Ni(PZ_3)_3R^2CN$ and $Ni(PZ_3)_2A$ wherein $PZ_3$, $R^2$ and A are defined as in claim 1.

12. The process of claim 11 wherein $PZ_3$ is tri-o-tolyl phosphite, $R^2$ is 2-butenyl and A is 3-pentenenitrile.

13. The process of claim 12 wherein the composition of the product fluid is controlled to provide a molar ratio of organic mononitrile to organic dinitrile of less than about 0.65 by conducting the hydrocyanation of mononitrile to dinitrile to a conversion of at least about 60 percent.

References Cited

UNITED STATES PATENTS

| | | | |
|---|---|---|---|
| 3,102,899 | 9/1963 | Cannell | 260—439 R |
| 3,235,629 | 2/1966 | Jones et al. | 260—990 |
| 3,420,904 | 1/1969 | Hellwig | 260—439 X |
| 3,453,302 | 1/1969 | Pregaglia et al. | 260—439 X |
| 3,547,964 | 12/1970 | Oliver | 260—429 R |
| 3,548,022 | 12/1970 | Iwamoto, et al. | 252—431 P X |

FOREIGN PATENTS

| | | | |
|---|---|---|---|
| 716,072 | 8/1965 | Canada | 260—439 |

OTHER REFERENCES

Latimer: Anal. Chem. 35 (1963), p. 1983.

Saunders: Ind. and Eng. Chem. 43 (1951), pp. 121–126.

Prutton, et al.: Fundamental Principle of Physical Chem., MacMillan Co., New York, N.Y. (1944), pp. 369–373.

JOSEPH P. BRUST, Primary Examiner